May 28, 1929. J. T. ROATEN 1,714,923
FASTENER FOR THE HOODS OF AUTOMOBILES
Original Filed Sept. 2, 1927
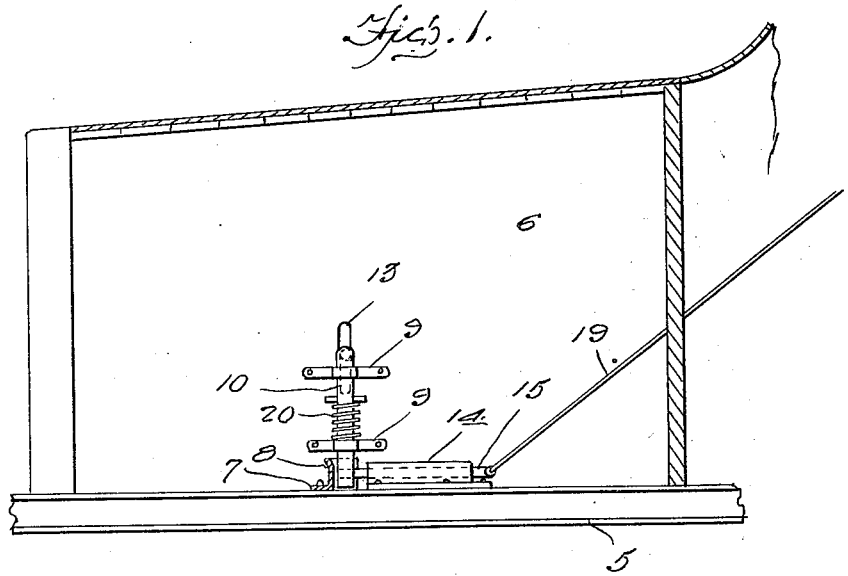
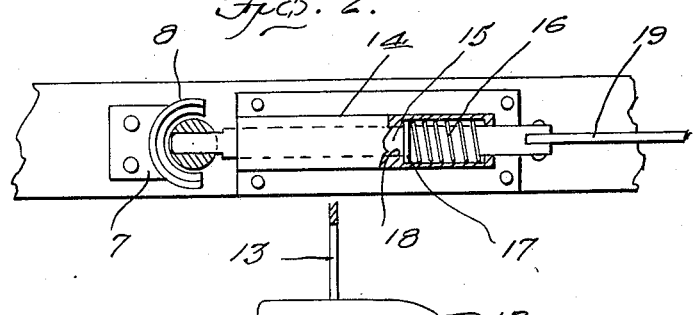
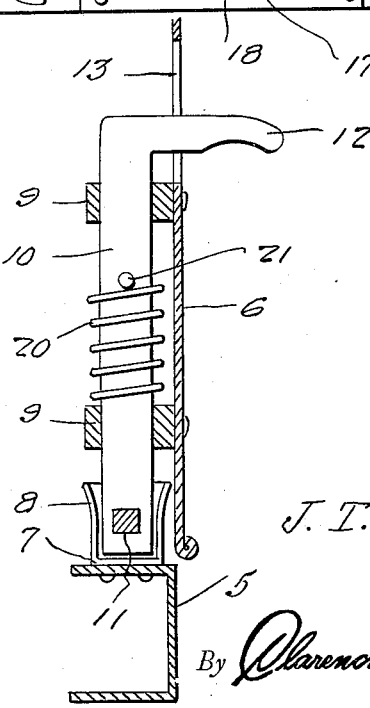
Inventor
J. T. Roaten
By Clarence A. O'Brien
Attorney Patented May 28, 1929.

1,714,923

UNITED STATES PATENT OFFICE.

JAMES T. ROATEN, OF SHERIDAN, WYOMING, ASSIGNOR OF SEVENTY PER CENT TO CHAS. R. NEHER, OF SHERIDAN, WYOMING.

FASTENER FOR THE HOODS OF AUTOMOBILES.

Application filed September 2, 1927, Serial No. 217,139. Renewed April 17, 1929.

The present invention relates to fasteners for the hoods of automobiles and one of the important objects of my invention is to provide a fastener for the opposite sides of the hood of an automobile which can only be released from the inside of the dash board of an automobile.

Another important object of the invention resides in the provision of a fastener for the hood of an automobile that is exceedingly simple in its construction, inexpensive to manufacture, thoroughly efficient and reliable in operation, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a sectional view through the hood of an automobile showing my improved fastening structure associated therewith, Figure 2 is a horizontal sectional view taken through the fastening mechanism, and, Figure 3 is a vertical sectional view therethrough.

Referring to the drawing in detail, it will be seen that in the present illustration of the invention, the numeral 5 denotes one side of the chassis and the numeral 6 one side of the hood. A stop member 7 is mounted on the chassis 5 and has an upstanding semi-cylindrical portion 8. A pair of brackets 9 are mounted inside of the hood ond slidably receive a shank 10, the lower end of which is provided with an opening 11 and the upper end of which is offset to provide a handle 12 extending through a slot 13 provided in the hood. A bolt casing 14 is mounted on the chassis 5 and has a bolt 15 slidable therein and normally projected from one end thereof by means of a spring 16 impinging against one end of the casing and against a shoulder 17 which is adapted to abut a shoulder 18 formed in the casing. The other end of the bolt also projects through the other end of the casing and has pivotally engaged therewith a rod 19 or the like. The first mentioned end of the bolt is reduced and normally projected through the opening 11 to prevent the raising of the shank 10, the lower end of which is held out of the semi-cylindrical portion 8 by means of a spring 20 which is disposed about the shank and impinges against the lower bracket 9 and pin 21. When the hood is closed, the operator presses downwardly on the handle 12 so as to seat the lower portion of the shank in the semi-cylindrical portion 8 of the stop 7 and then releases the bolt 15 so that the reduced end thereof may project through the opening 11. The spring thus prevents rattling and holds the hood down tightly. When it is desired to release or open the hood, the operator may release the bolt 15 from inside the dashboard and the spring 20 will then lift the shank 10 upwardly and the hood may be opened in the ordinary and usual manner. With this device it will be seen that unauthorized persons will be prevented from tinkering with the engine because in the closed-type car the doors may be locked, and access may not be had to the rod 19.

It is thought that the construction, utility, operation, and advantages of this invention will now be quite clearly understood by those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

A fastener for the hood of an automobile, comprising a horizontal casing adapted to be secured on the chassis of the automobile, a spring pressed bolt in the casing normally projecting outwardly therefrom at one end, a pair of brackets adapted to be fixed in vertical alignment inside of the hood, a shank slidable through the brackets, the lower end of the shank being provided with an opening to receive the bolt, a spring associated with the shank to normally hold the same raised, a stop adapted to be secured to the chassis and having a semi-cylindrical portion to receive the lower end of the shank and the outer end of the bolt.

In testimony whereof I affix my signature.

JAMES T. ROATEN.